United States Patent

Hooper, Jr.

[15] 3,635,036

[45] Jan. 18, 1972

[54] METHOD AND APPARATUS FOR CONNECTING A PIPELINE ACROSS AN OBSTRUCTION

[72] Inventor: William Coggin Hooper, Jr., Wichita Falls, Tex.

[73] Assignee: Trunkline Gas Company, Houston, Tex.

[22] Filed: Mar. 16, 1970

[21] Appl. No.: 19,959

[52] U.S. Cl. ................................61/72.1, 61/42, 61/72.7, 175/61
[51] Int. Cl. .........................................F16l 1/00, E02g 3/00
[58] Field of Search ..................................61/72.1–72.7, 42; 175/61

[56] References Cited

UNITED STATES PATENTS 3,208,537  9/1965  Scarborough..........................175/61 X
3,518,840  7/1970  Mertz......................................61/72.1

*Primary Examiner*—J. Karl Bell
*Attorney*—Hyer, Eickenroht, Thompson & Turner

[57] ABSTRACT

A first well bore is drilled from one side of an obstruction, such as a river. A second well bore is drilled from the other side until it intersects the first well bore. Casing is run into both well bores and connected together at the intersection of the well bores to provide a conduit for connecting the pipeline sections on opposite sides of the obstruction.

14 Claims, 7 Drawing Figures

PATENTED JAN 18 1972

William C. Hooper, Jr.
INVENTORS.

BY Hyer, Eickenroht
+ Thompson

ATTORNEYS

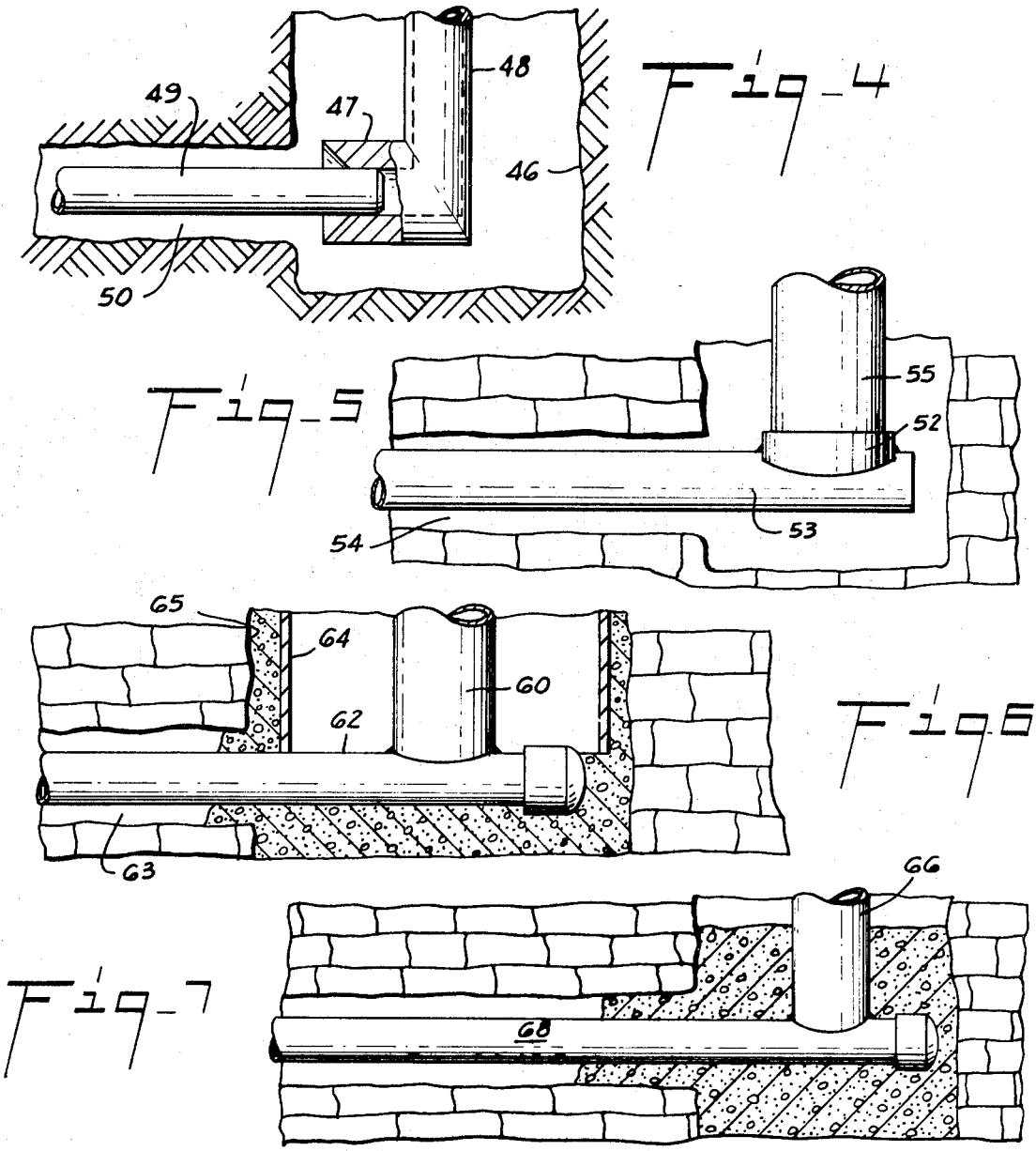

METHOD AND APPARATUS FOR CONNECTING A PIPELINE ACROSS AN OBSTRUCTION

This invention relates to an improved method of and apparatus for connecting a pipeline across an obstruction, such as a river.

This invention is related to the invention disclosed in U.S. Pat. No. 3,518,840, issued July 7, 1970, and entitled "Method of and Apparatus for Connecting a Pipeline Across an Obstruction." Both inventions are assigned to a common assignee.

In the previously filed application, a method and apparatus is taught whereby a pipeline can be constructed around an obstruction by drilling well bores from opposite sides of the obstruction and setting a string of well casing in each well bore. A cavity that is common to both well bores connects the well bores below the casing in each well. The pipeline fluid passes from one side of the obstruction to the other through the casing string in one of the wells to the cavity and then to the surface through the casing in the other well.

It is an object of this invention to provide apparatus for and a method of constructing a pipeline around an obstruction wherein the fluid is conducted from one side of the obstruction to the other through a continuous conduit formed of well casing.

It is another object of this invention to provide a method of and apparatus for constructing a pipeline around an obstruction wherein two well bores are drilled from opposite sides of the obstruction and casing strings are located in the well bores and connected together adjacent the intersection of the two well bores to provide a conduit through which fluid carried by the pipeline can flow from one side of the obstruction to the other.

These and other objects, advantages, and features of this invention will be apparent to those skilled in the art from a consideration of this application, including the attached drawings and appended claims.

The invention will now be described in connection with attached drawings in which, FIG. 1 is a cross-sectional view of a river with a pipeline being constructed across the river in accordance with this invention;

Figure 2:
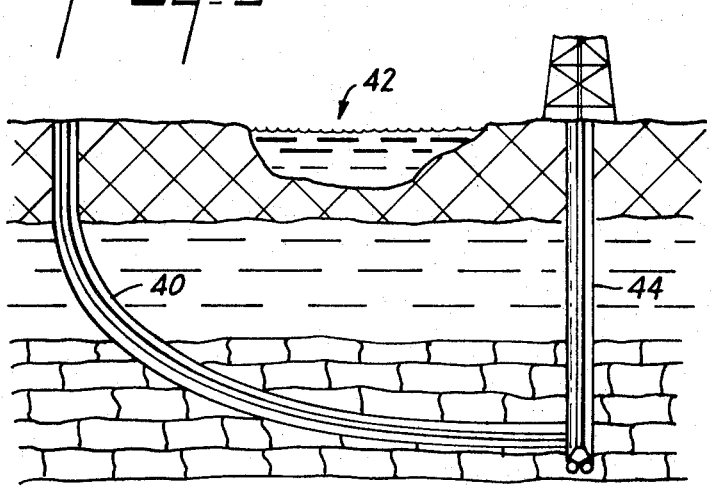
FIG. 2 is a view similar to FIG. 1 showing an alternate arrangement of the well bores in which the casing is to be located to connect the sections of pipeline on opposite sides of the river.

FIGS. 4, 5, 6, and 7 are alternate arrangements for connecting together well casing when the well bores are drilled as shown in FIG. 2.

Figure 1:
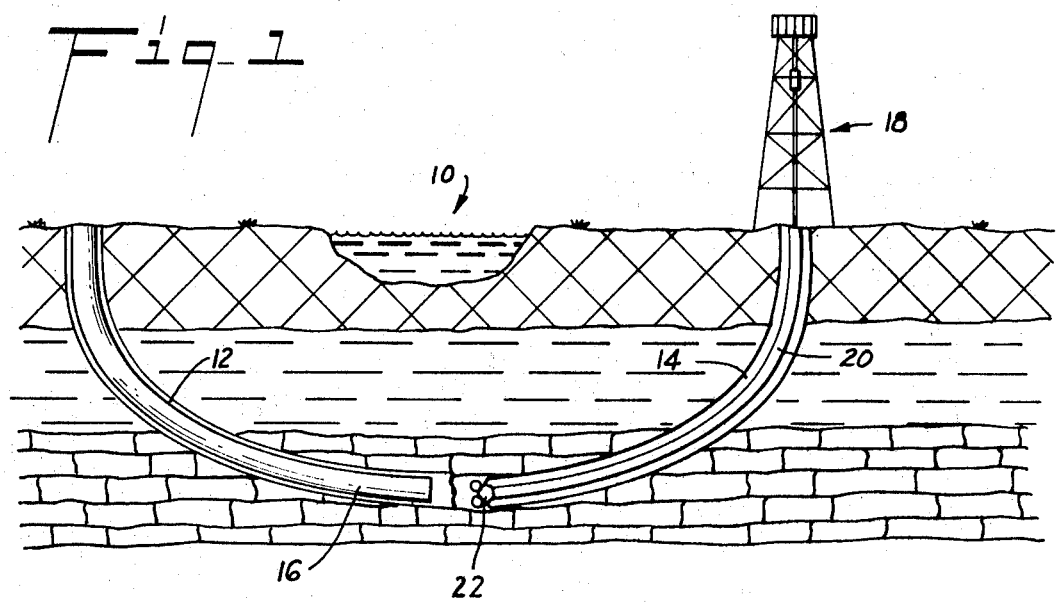

In FIG. 1, river 10 lies in the path of a pipeline. As discussed in the application mentioned above, Ser. No. 716,462, the construction of a pipeline across a large river, particularly where it is a navigable river, is a very time consuming and expensive operation. In accordance with the apparatus and method of this invention, a pipeline is constructed across river 10 by drilling a first well bore 12 from the left-hand side of the river, as shown in FIG. 1. A second well bore 14 is drilled from the other side of the river until it intersects the first well bore. In FIG. 1, first well bore 12 has been drilled. Also, a first string of well casing 16 has been run into the first well bore. Well bore 14 is being drilled as shown in FIG. 1 by drilling rig 18. The drilling rig shown is a rotary type, having a string of drill pipe 20 which rotates drilling bit 22 in the conventional manner. Well bore 14 is drilled until it intersects well bore 12. A string of casing 24 then can be run into second well bore 14 and connected to the end of casing 16. Completion of the bypass of the obstruction can be completed by connecting the well casings into the pipeline at the surface on opposite sides of the river.

Figure 3:
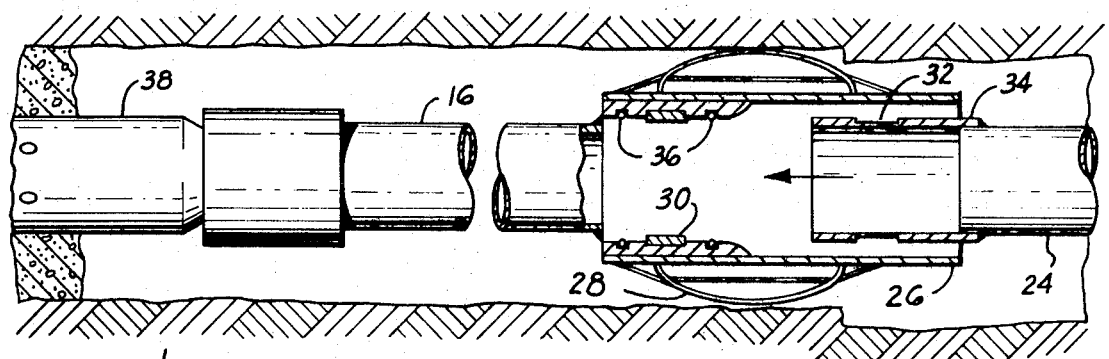
FIG. 3 is a view similar to FIG. 1 with the well casing in the well bores and with the two lower ends of the well casing shown on an enlarged scale to illustrate the connection between the well casings.

One means for connecting the ends of casing strings 16 and 24 is shown in FIG. 3. Preferably, well bores 12 and 14 curve about 90° so that they are about horizontal when they intersect. This allows the ends of the two casing strings to more or less abut each other. Casing string 16 can be run first. It is provided, as shown, in the drawings with the female portion of a connector, such as the "Squnch Joint" manufactured by VETCO, Inc. The female section includes tubular shroud 26, which is equipped with centralizer 28. Inside shroud 26 are latch dogs 30 that snap into annular groove 32 on the outside surface of coupling 34. This coupling is attached to the lower end of second casing string 24. By moving coupling 24 into shroud 26 until dogs 30 engage annular groove 32, the ends of the two casing strings will be connected together. Seal rings 36 provide a seal between the two strings of casing.

Positioned in casing string 16 and spaced from the connector is stage cementing collar 38. A similar cementing collar (not shown) is located in pipe string 44 above its lower end. These cementing collars allow the casing strings to be cemented in their respective well bores after their lower ends are connected together by the mechanical coupling described above. Preferably, well bore 12 is drilled and casing string 16 run, cemented, and drilled out before well bore 14 is started. Well bore 14 is then drilled, casing string 24 is run into position and connected to string 16 through the mechanical connector. This string can now be cemented in place through the cementing stage collar located in the string above the mechanical connector. Afterward, the cement is drilled out of casing string 24. Taking the steps of the method of the invention in that order makes it unnecessary to move a drilling rig back to well bore 12 or to leave one there while the second hole is being drilled.

Instead of drilling two holes that curve to an intersection as shown in FIGS. 1 and 3, one hole can be curved or slanted so that it bottoms out underneath the other side of the obstruction. The second well bore then can be more or less vertical. This arrangement is shown in FIG. 2, where well bore 40 curves from one side of river 42 to a point below the other side where it is intersected by vertical well bore 44. With this method, various connectors can be used to connect the casing in the two well bores.

FIGS. 4–7 illustrate various ways of connecting the well casings. If the diameter of vertical well bore 44 is large enough, connector 47, such as the type described above in FIG. 3, can be connected to well casing 48 to extend laterally at a 90° angle. Well casing 49 can be run through well bore 50 and stabbed into the connector, as shown in FIG. 4.

In FIG. 5, collar 52 is connected in the end of casing string 53 that runs through the slanted bore hole 54. Casing string 55 in the vertical hole can then be stabbed into connector 52 which will be provided with appropriate seals to seal off between the two casing strings. The two strings can be cemented in the holes using stage cementing equipment.

In FIG. 6, casing 60 is run into position to engage casing string 62 after large diameter casing 64 has been placed in vertical hole 65. By using large diameter casing 64, a welder can be lowered into the hole to weld the two casing strings together.

In FIG. 7, vertical string 66 is beveled to engage the outside surface of slanted string 68. Once in engagement, as shown in FIG. 7, cement is spotted around the ends of the two well casings and allowed to harden. Afterwards, a mill is run down the vertical pipe and a hole can be cut in the side of the slanted pipe to complete the connection between the two well casings.

From the foregoing description of one embodiment of this invention, by way of example, it will be seen that this invention is one well adapted to attain all of the ends and objects hereinabove set forth, together with other advantages which are obvious and which are inherent to the apparatus and method.

I claim:

1. A method of constructing a pipeline around an obstruction, such as a river, comprising drilling a first well bore from one side of the obstruction, drilling a second well bore from the other side of the obstruction that intersects the first well bore, positioning a casing string in each well bore, connecting the lower ends of the two strings so the two casing strings and the connections between them provide a continuous conduit extending from one side of the obstruction to the other to isolate fluid flowing through the casing strings and the connection between them from the well bores, and connecting the well casing to the pipeline on each side of the obstruction to permit the fluid carried by the pipeline to flow down the well casing of one well bore and back to the pipeline through the other well casing.

2. The method of claim 1 with the additional step of sealing between the casing strings and the well bore adjacent the connection.

3. The method of claim 1 with the additional step of pumping cement into the annular space between the casing strings and the well bores.

4. A method of constructing a pipeline around an obstruction, such as a river, comprising drilling a first well bore from one side of the obstruction to a point under the other side of the obstruction, drilling a second well bore from the other side of the obstruction that intersects the first well bore, positioning a casing string in each well bore, connecting the two casing strings so that the two casing strings and the connections between them provide a continuous conduit extending from one side of the obstruction to the other to isolate fluid flowing through the casing strings and the connection between them from the well bores, and connecting the well casing to the pipeline on each side of the obstruction to permit the fluid carried by the pipeline to flow down the well casing of one well bore and back to the pipeline through the other well casing.

5. The method of claim 4 with the additional step of sealing between the casing strings and the well bore adjacent their connection.

6. The method of claim 4 with the additional step of pumping cement into the annular space between the casing strings and the well bores.

7. Apparatus for connecting two sections of a pipeline located on opposite sides of an obstruction, such as a river or the like, comprising a first well bore extending downwardly into the ground from one side of the obstruction, a second well bore extending downwardly into the ground from the other side of the obstruction and intersecting the first bore, well casing located in the well bores and extending from one side of the obstruction to the other to provide a continuous tubular conduit that extends through the well bores for connecting to the pipeline section on each side of the obstruction to carry the fluid flowing in the pipeline past the obstruction.

8. The apparatus of claim 7 in which the well casing includes a first string of well casing positioned in the first well bore, a second string of well casing positioned in the second well bore, and means carried by the well casing to connect the adjacent ends of the two casing strings.

9. The apparatus of claim 8 further provided with seal means in the annular space between the casing and the well bores adjacent the connection between the first and second strings of well casing.

10. A method of constructing a pipeline around an obstruction, such as a river, comprising drilling a first well bore into the ground from one side of the obstruction, positioning a first casing string in the well bore to extend from the surface where it can be connected to the pipeline section on said one side to a level above the bottom of the well bore, cementing the casing in the well bore, drilling a second well bore from the other side of the obstruction that intersects the first well bore below the end of the first casing string, positioning a second casing string in the second well bore, connecting the second casing string to the first casing string through connecting means attached to the casing strings, and cementing the second string in the second well bore.

11. A method of constructing a pipeline around an obstruction, such as a river, comprising drilling a first well bore that extends from one side of the obstruction to a position below the ground on the other side of the obstruction, drilling a second well bore from the other side of the obstruction that intersects the first well bore, positioning a casing string in each well bore, and connecting the two casing strings with connector means carried by the casing strings to connect the casing strings through the connecting means to provide a conduit for conducting the fluid carried by the pipeline from one side to the other of the obstruction.

12. Apparatus for connecting two sections of a pipeline located on opposite sides of an obstruction, such as a river or the like, comprising a first well bore extending downwardly into the ground from one side of the obstruction to a position below the ground on the other side of the obstruction, a second well bore extending downwardly into the ground from the other side of the obstruction and intersecting the first bore, well casing located in the well bores and extending from one side of the obstruction to the other through the well bores for connecting to the pipeline section on each side of the obstruction to provide a continuous tubular conduit through which the fluid flowing in the pipeline can flow from one side of the obstruction to the other past the obstruction while confined to the well casing and out of contact with the well bores.

13. The apparatus of claim 12 in which the well casing includes a first string of well casing positioned in the first well bore, a second string of well casing positioned in the second well bore, and means carried by the well casing to connect the adjacent ends of the two casing strings.

14. The apparatus of claim 13 further provided with seal means in the annular space between the casing and the well bores adjacent the connection between the first and second strings of well casing.

* * * * *